United States Patent
Michaelis et al.

(10) Patent No.: US 8,553,849 B2
(45) Date of Patent: Oct. 8, 2013

(54) PERSONAL IDENTIFICATION AND INTERACTIVE DEVICE FOR INTERNET-BASED TEXT AND VIDEO COMMUNICATION SERVICES

(75) Inventors: Paul Roller Michaelis, Louisville, CO (US); Roger L. Toennis, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1034 days.

(21) Appl. No.: 12/486,605

(22) Filed: Jun. 17, 2009

(65) Prior Publication Data
US 2010/0322391 A1 Dec. 23, 2010

(51) Int. Cl.
*H04M 11/00* (2006.01)
(52) U.S. Cl.
USPC ........................................ 379/52; 379/88.17
(58) Field of Classification Search
USPC .................... 455/457, 466, 551, 41.2; 379/52
See application file for complete search history.

(56) References Cited

U.S. PATENT DOCUMENTS

| | | | |
|---|---|---|---|
| 5,035,252 A | 7/1991 | Mondre | |
| 5,537,447 A | 7/1996 | Urbansky | |
| 5,619,514 A | 4/1997 | Smith | |
| 5,745,425 A | 4/1998 | Anderson et al. | |
| 5,848,360 A * | 12/1998 | O'Connell et al. | 455/551 |
| 5,859,882 A | 1/1999 | Urbansky | |
| 5,920,507 A | 7/1999 | Takeuchi et al. | |
| 5,978,806 A * | 11/1999 | Lund | 707/812 |
| 6,141,788 A | 10/2000 | Rosenberg et al. | |
| 6,170,075 B1 | 1/2001 | Schuster et al. | |
| 6,243,836 B1 | 6/2001 | Whalen | |
| 6,260,071 B1 | 7/2001 | Armistead et al. | |
| 6,381,645 B1 | 4/2002 | Sassin | |
| 6,434,590 B1 | 8/2002 | Blelloch et al. | |
| 6,434,606 B1 | 8/2002 | Borella et al. | |
| 6,452,950 B1 | 9/2002 | Ohlsson et al. | |
| 6,542,489 B1 * | 4/2003 | Kari et al. | 370/338 |
| 6,650,637 B1 | 11/2003 | Bansal et al. | |
| 6,654,060 B1 * | 11/2003 | Kurosawa et al. | 348/333.02 |
| 6,690,675 B1 | 2/2004 | Kung et al. | |
| 6,714,864 B2 * | 3/2004 | Odamura | 701/455 |
| 6,763,226 B1 | 7/2004 | McZeal, Jr. | |
| 6,769,027 B1 | 7/2004 | Gebhardt et al. | |
| 6,799,033 B2 * | 9/2004 | Kanefsky | 455/412.1 |
| 6,823,047 B1 | 11/2004 | Cruickshank | |
| 6,845,129 B2 | 1/2005 | Golin | |
| 6,862,298 B1 | 3/2005 | Smith et al. | |

(Continued)

FOREIGN PATENT DOCUMENTS

DE 10211740 10/2003
DE 102006027708 2/2008

(Continued)

OTHER PUBLICATIONS

Partial Search Report for European Patent Application No. 10165965.4, mailed Nov. 4, 2010.

(Continued)

*Primary Examiner* — Simon Sing
(74) *Attorney, Agent, or Firm* — Sheridan Ross P.C.

(57) ABSTRACT

The present invention is directed to a method and device for assigning a telephone number to a browsing session and for providing physical location information to a public safety answering point in association with a web-based chat or relay session.

13 Claims, 4 Drawing Sheets

(56) References Cited

U.S. PATENT DOCUMENTS

| | | |
|---|---|---|
| 6,879,582 B1 | 4/2005 | Dhara et al. |
| 6,914,964 B1 | 7/2005 | Levine |
| 6,977,948 B1 | 12/2005 | Chennubhotla et al. |
| 7,058,393 B2 * | 6/2006 | Sugane .................. 455/414.1 |
| 7,099,288 B1 * | 8/2006 | Parker et al. .................. 370/259 |
| 7,203,193 B2 | 4/2007 | Hoof |
| 7,215,959 B2 | 5/2007 | Creamer et al. |
| 7,242,963 B1 * | 7/2007 | Karstens et al. ............. 455/557 |
| 7,293,176 B2 | 11/2007 | Otway et al. |
| 7,299,067 B2 * | 11/2007 | Riggs .................. 455/556.2 |
| 7,352,766 B2 | 4/2008 | Van Asten et al. |
| 7,359,979 B2 | 4/2008 | Gentle et al. |
| 7,385,985 B2 | 6/2008 | Narsinh et al. |
| 7,386,115 B2 | 6/2008 | Peters |
| 7,418,002 B2 | 8/2008 | Robotham et al. |
| 7,496,750 B2 | 2/2009 | Kumar et al. |
| 7,626,994 B2 | 12/2009 | Bennett |
| 7,627,097 B2 | 12/2009 | Kawabata et al. |
| 7,702,947 B2 | 4/2010 | Peddada |
| 2001/0028634 A1 | 10/2001 | Huang et al. |
| 2002/0073208 A1 | 6/2002 | Wilcock et al. |
| 2002/0101853 A1 | 8/2002 | Siegrist et al. |
| 2003/0133553 A1 * | 7/2003 | Khakoo et al. ........... 379/142.01 |
| 2003/0163328 A1 | 8/2003 | Rambo et al. |
| 2003/0198218 A1 | 10/2003 | Farris et al. |
| 2004/0057445 A1 | 3/2004 | LeBlanc |
| 2004/0076190 A1 | 4/2004 | Goel et al. |
| 2004/0120309 A1 | 6/2004 | Kurittu et al. |
| 2004/0233898 A1 | 11/2004 | Otsuka et al. |
| 2005/0074008 A1 | 4/2005 | Herledan et al. |
| 2005/0094618 A1 | 5/2005 | Colban et al. |
| 2005/0249146 A1 | 11/2005 | Pinault et al. |
| 2006/0007915 A1 | 1/2006 | Frame |
| 2006/0025164 A1 * | 2/2006 | Wang et al. .................. 455/466 |
| 2006/0062371 A1 | 3/2006 | Vanderheiden et al. |
| 2006/0083199 A1 | 4/2006 | Yang |
| 2006/0126667 A1 | 6/2006 | Smith et al. |
| 2006/0140221 A1 | 6/2006 | Yamada et al. |
| 2006/0166716 A1 | 7/2006 | Seshadri et al. |
| 2006/0203805 A1 | 9/2006 | Karacali-Akyamac et al. |
| 2006/0233158 A1 | 10/2006 | Croak et al. |
| 2006/0251051 A1 | 11/2006 | Bhatt et al. |
| 2006/0256772 A1 | 11/2006 | Yarlagadda |
| 2006/0277051 A1 | 12/2006 | Barriac et al. |
| 2007/0026852 A1 | 2/2007 | Logan et al. |
| 2007/0081460 A1 | 4/2007 | Karacali-Akyamac et al. |
| 2007/0110034 A1 | 5/2007 | Bennett |
| 2007/0147399 A1 | 6/2007 | Deng et al. |
| 2007/0167156 A1 | 7/2007 | Hundal |
| 2007/0177579 A1 | 8/2007 | Diethorn et al. |
| 2007/0183323 A1 | 8/2007 | Hannu et al. |
| 2007/0211704 A1 | 9/2007 | Lin et al. |
| 2007/0223467 A1 | 9/2007 | Makiuchi et al. |
| 2007/0280428 A1 | 12/2007 | McClelland |
| 2007/0291733 A1 | 12/2007 | Doran et al. |
| 2008/0002689 A1 | 1/2008 | Vera |
| 2008/0013528 A1 | 1/2008 | Miller et al. |
| 2008/0165708 A1 | 7/2008 | Moore et al. |
| 2008/0187108 A1 | 8/2008 | Engelke et al. |
| 2008/0205377 A1 | 8/2008 | Chao et al. |
| 2008/0232353 A1 | 9/2008 | Vafin et al. |
| 2008/0232442 A1 | 9/2008 | Rodbro et al. |
| 2008/0240004 A1 | 10/2008 | Shaffer et al. |
| 2008/0285599 A1 | 11/2008 | Johansson et al. |
| 2008/0298336 A1 | 12/2008 | Gollamudi |
| 2008/0298349 A1 | 12/2008 | Beightol et al. |
| 2008/0310398 A1 | 12/2008 | Jain et al. |
| 2009/0074012 A1 | 3/2009 | Shaffer et al. |
| 2009/0213837 A1 | 8/2009 | Ku et al. |
| 2009/0234940 A1 | 9/2009 | Pal et al. |
| 2009/0235329 A1 | 9/2009 | Chavez et al. |
| 2010/0165857 A1 | 7/2010 | Meylan et al. |

FOREIGN PATENT DOCUMENTS

| | | |
|---|---|---|
| EP | 0152251 | 8/1985 |
| EP | 1471708 | 10/2004 |
| EP | 1515506 | 3/2005 |
| EP | 1681844 | 7/2006 |
| EP | 1729450 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

Extended Search Report for European Patent Application No. 10165965.4, dated Feb. 10, 2011.

CounterPath Corporation; "Network Convergence Gateway (NCG)" Internet Article printed on Nov. 25, 2008 from http://www.counterpath.com/network-convergence-gateway-ncg.html; 2 pages.

Stevenson; "F/MC Watch: MobileSTICK a Silver Lining for Mobile Operators"; Internet Article printed on Feb. 6, 2009 from http://www.voipplanet.com/solutions/article.php/3670276; 6 pages.

Wikipedia; "Network switching subsystem"; Internet Article printed on Feb. 6, 2009 from http://en.wikipedia.org/wiki/Home_Location_Register; 10 pages.

Wikipedia; "Subscriber Identity Module"; Internet Article printed on Feb. 6, 2009 from http://en.wikipedia.org/wiki/Subscriber_Identity_Module; 8 pages.

U.S. Appl. No. 12/406,784, filed Mar. 18, 2009, Michaelis, et al.
U.S. Appl. No. 12/430,697, filed Apr. 27, 2009, Michaelis, et al.
U.S. Appl. No. 12/426,023, filed Apr. 17, 2009, Michaelis, et al.
U.S. Appl. No. 12/433,334, filed Apr. 30, 2009, Brinkmann, et al.
U.S. Appl. No. 12/548,271, filed Aug. 26, 2009, Michaelis, et al.
U.S. Appl. No. 12/361,950, filed Jan. 29, 2009, Michaelis, et al.
U.S. Appl. No. 12/371,065, filed Feb. 13, 2009, Michaelis, et al.

Azuri, "Edgewater Networks, Inc. Announces Extension of VoIP Failover Capabilities at the Enterprise Edge", http://74.125.95.104/search?q=cache:JgCKutpPN7gJ:voipservices.tmcnet.com/feature/article, Nov. 16, 2007, printed on Dec. 3, 2008, pp. 1-3.

Federal Register vol. 73, No. 139 Friday, Jul. 18, 2008, "Rules and Regulations", pp. 41258-41259.

Gurock, et al., "Selecting the Right License Strategy for your Software", printed on Jul. 25, 2009, from the Internet at http://blog.gurock.com/articles/selecting-the-right-license-strategy-for-your-software, 6 pages.

"Indepth: Jitter", VoIP Troubleshooter website, available at http://www.voiptroubleshooter.com/indepth/jittersources.html, accessed on Oct. 22, 2009, pp. 1-8.

Webopedia; What is jitter buffer?—A Word Definition for the Webopedia Computer Dictionary; printed from http://www.webopedia.com/TERM/J/jitter_buffer.html on Mar. 10, 2009; 6 pages.

Wikipedia; Jitter—From Wikipedia, the free encyclopedia; printed from http://en.wikipedia.org/wiki/Jitter on Mar. 10, 2009; 6 pages.

Wikipedia "H.323", http://en.wikipedia.org/w/index.php?title=H.323&printable=yes, Dec. 18, 2008, 14 pages.

Wikipedia "RTP Control Protocol"; http://en.wikipedia.org/w/index.php?title=RTP_Control_Protocol< . . . Jan. 9, 2009, 3 pages.

Wikipedia "Voice over Internet Protocol"; http://en.wikipedia.org/wiki/Voice_over_Internet_Protocol Jan. 23, 2009, 15 pages.

Wikipedia "H.245"; http://en.wikipedia.org/wiki/H.245 Nov. 9, 2009, 1 page.

Hahn N: "Dialog Via Internet Call Center" Nachrichtentechnik Elektronik, VEB Verlag Technik. Berlin, DE, vol. 48, No. 4, Jul. 1, 1998 pp. 17-19, XP000784128, ISSN: 0323-4657.

Background for the above captioned application (previously provided).

Official Action (with English translation) for Chinese Patent Application No. 201010205345.2, dated Jul. 2, 2013, 21 pages.

* cited by examiner

PERSONAL IDENTIFICATION AND INTERACTIVE DEVICE FOR INTERNET-BASED TEXT AND VIDEO COMMUNICATION SERVICES

FIELD

The invention relates generally to web-assisted communications and particularly to web-assisted communications for one or more communicants with a disability.

BACKGROUND

Since the mid-1960's, the way most deaf and hard-of-hearing people in the United States have telecommunicated is to rely on Public Switched Telephone Network ("PSTN")-connected text terminals, commonly known as TeleTYpewriters ("TTY's). Typically, the way that a TTY user interacts with a non-TTY user is for the call to be placed via a "relay service." In this scenario, the relay operator acts as a text-to-speech and speech-to-text translator. The TTY user sends text to the relay operator, the relay operator reads the text to the non-TTY user, the non-TTY user then speaks to the relay operator, who then types the corresponding text to the TTY user. One notable exception to this scenario is that emergency response agents at a Public Safety Answering Point ("PSAP"), a physical location where 911 emergency telephone calls are received and then routed to the proper emergency services, must be able to interact with TTY users directly, without requiring the 9-1-1 calls to be placed via a relay service.

A problem is that the signaling protocol used by TTYs, namely 45.45 baud Baudot, has several limitations, notably a maximum transmission rate of only six characters per second, a very limited character set (for example, there are no lower case letters), and a half-duplex transmit/receive model that requires users to take turns typing to each other. For this reason, many people in the deaf and hard-of-hearing communities prefer the conversational functionality that is supported by browser-equipped Internet-connected Personal Computers ("PCs"). Common examples run the gamut from simple conversational text and Instant Messaging ("IM") protocols through high-bandwidth video connections that support the transmission and receipt of sign language. Because the browser-based PC interfaces are so much faster and more user-friendly than the TTY interface, IP-access relay services have grown tremendously in popularity, to the point that many states now classify IP relay as a reimbursable service, i.e., a service that is provided without charge to the user, paid for by the same "universal service" fund that covers the expenses of PSTN-based relay. Not surprisingly, many people in the deaf and hard-of-hearing communities have abandoned their TTYs and have adopted IP-based text and video as their primary means of telecommunication.

The migration from TTY devices to IP mechanisms has created a new problem. Public Safety Answering Points ("PSAPs"") rely on "caller ID" information to respond quickly and correctly to incoming calls. Specifically, the ID of an incoming call triggers a rapid automatic response from the PSAP's emergency database. This allows PSAP agents to view critical data immediately, such as the caller's medical history, location, and directions to that location. Caller ID information is provided to PSAPs with calls that are made via PSTN-connected TTYs. Unfortunately, this information is not provided when the originating endpoint is an IP-connected PC. For this reason, emergency response specialists at the PSAP must manually/textually ask the caller to provide the information that would normally be available automatically, thereby delaying the response and making it more likely that the response will be incorrect.

In response to the problem as well as problems associated with non-emergency identification of IP relay service users, the FCC has recently adopted rules "Federal Register/Vol. 73, No. 139/Friday, Jul. 18, 2008/Rules and Regulations", requiring the assignment of a ten-digit telephone number in the North American Numbering Plan ("NANP") to every valid user of IP text and video relay. These FCC rules outline the establishment of a central data repository for mapping IP addresses of Internet connected devices to a valid PSTN phone number that has been assigned to a certified user. The rules further specify generally the establishment of a neutral third party entity to construct and manage this repository. Also outlined in the rules is the need for the third party non-government agency to issue ten-digit NANP numbers, either as an authorized telephony carrier or in cooperative partnership with carriers.

Unfortunately, the FCC's explanatory document (http://www.fcc.gov/cgb/consumerfacts/trstendigit.html) provides no engineering guidance about how the FCC's objectives are to be achieved. What they seem to be envisioning is that ten-digit phone numbers can be mapped to specific IP addresses. The problem with this approach is that it does not account for the highly dynamic and transient nature of IP address assignment to networked devices. IP addresses are almost always dynamically assigned to networked devices and can change unpredictably as a device is connected, disconnected, and then reconnected again, to an IP network. Given this situation, there is no reliable and efficient way of tracking a specific user and device in relation to the IP address assigned to that device.

A related problem with the ruling is that there must be a centralized database and mechanism, such that the users of non-telephony Internet communication media can be identified automatically and immediately based on the ten-digit phone number. The assignment of ten-digit phone numbers and the subsequent maintenance of the databases that contain those mappings would probably be the responsibility of the relay services, chiefly because they are the intersection point between the IP network and the PSTN. If IP addresses are to be used as the basis for the mappings, the service provider would need access to an authoritative entity that can be relied upon to provide accurate and timely tracking information of a specific device's IP address changes over time. Because of the way IP networks are engineered, with private LANs and virtual IPs behind NAT (Network Address Translation) boundaries, no such entity exists. Further, it is clear that no such entity could ever be successfully constructed using the networking technologies in common use today.

The shortfall is currently addressed in part by requiring users of IP relay services to enter accurate location information as part of their IP relay session initiation and use. In emergency situations, however, the ability of the contactor to enter accurate location information may be compromised due to physical or emotional condition. Accordingly, there is still a need for a method and system for complying with the FCC rules.

SUMMARY

These and other needs are addressed by the various embodiments and configurations of the present invention. The invention is directed generally to associating a telephone number with a web browsing session and/or to providing physical location information to a public safety answering point in the context of a web-based text chat or video session.

In one embodiment, a method includes the steps:

(a) providing, at a first time, in response to a selected stimulus, and by a telephone network, a data network address and a corresponding telephone number, the data network address and telephone number being associated with a contactor; and (b) initiating, at a second time, from the data network address, and over a data network, a communication requesting emergency assistance, wherein at least one of a physical location of the contactor and contactor information is determined using the telephone number.

In the method, the telephone call acts effectively as a request to initiate a text-based communication session over the data network or Internet. The request effectively states to the PSAP or relay service that the text-based Internet communication the PSAP or relay service is about to receive via a URL accessed by the contactor and from a specified data address is associated with the telephone number originating the call. The method further enables a stationary, or static, telephone number to be paired with a potentially dynamically changing data network address of a user. The telephone connectivity may be enabled by a portable device, such as a Subscriber Identity Module ("SIM"), which can be carried by a user, particularly a hearing impaired user, and engaged with a computer or laptop to provide text-based communication capabilities. Regardless of the data network address of the computer or laptop, the portable device would provide by a telephone call, such as to a Public Safety Answering Point ("PSAP") or relay service, the telephone number and data network address in temporal proximity to the user attempting to initiate or initiating a communication session with a Universal Resource Locator ("URL") of the PSAP or relay service. From the telephone number, a physical location and/or other information of the user can be determined.

In another embodiment, a method includes the steps of:

(a) receiving, via an address assignment module of a contactee and by a call over a telephone network, one or more of a Universal Resource Locator ("URL") and a data network address of a computational device of a contactor; and (b) in response, initiating, using the at least one of a URL and data network address and by a computational device of the contactee, one or more of a text- and video-based session with the contactor.

The method enables a text-based communication session with a hearing impaired contactee to be initiated even when the contactee is not connected to the URL of a relay service. This is done by the contactor placing a call to a telephone number of, for example, a portable device, such as a SIM, of the contactee. The telephone call is effectively a request to open a communication channel over the data network with a data network address associated with the telephone number. Over the telephone network, a URL and/or contactor data network address are provided to the contactee's device. In response, the contactee's web browser accesses automatically the URL to initiate the session. This methodology can ensure that the contactee is always contactable by a text-based Internet session, even when he or she is not readily contactable by the Internet.

In another embodiment, a communication node includes:

(a) a computational device having a network address on a data network; and (b) a portable address assignment module having a telephone number on a telephone network, the portable address assignment module being at least one of engaged physically and in communication wirelessly with the computational device and including:

i. a subscriber identity agent comprising a unique service-subscriber key to identify a corresponding subscriber and ii. an assistive communication application to enable the identified subscriber, who has a communication impairment, to communicate, over the data network, with another party.

The present invention can provide a number of advantages depending on the particular configuration. The invention can assign unique and static ten-digit phone numbers to the non-telephony Internet endpoints that are used by people with disabilities for telecommunication. This ability can not only provide caller ID information that a Public Safety Answering Point ("PSAP") needs to respond quickly and correctly to an emergency but also provide accurate physical location information, as part of a browser session, to the PSAP, thereby complying with the newly adopted FCC rules. The location information can be determined dynamically and effortlessly as the user moves from node-to-node. The invention can therefore account for the highly dynamic and transient nature of IP address assignment to networked devices. Because the network is being provided with the information it needs to do a reliable real-time association of an internal endpoint with a ten-digit phone number, a user-initiated communication to a relay center or PSAP can be tagged automatically with the auxiliary information required by the FCC. The invention can also allow a person with disabilities to use any Local Area Networked ("LAN")-connected computer, whether or not owned by them (e.g., a computer in a hotel or in a colleague's office), as a non-telephony Internet-based telecommunication endpoint that is identified to the network as being associated with their unique ten-digit phone number, which typically is a valid NANP telephone number already associated with the user. Another benefit of configuring the address assignment module as a Subscriber Identity Module ("SIM") card is that it enables the relay service to determine which state or governmental entity to bill for the session. The area code of the SIM card would easily map to an appropriate, responsible state or governmental entity.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" or "agent" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
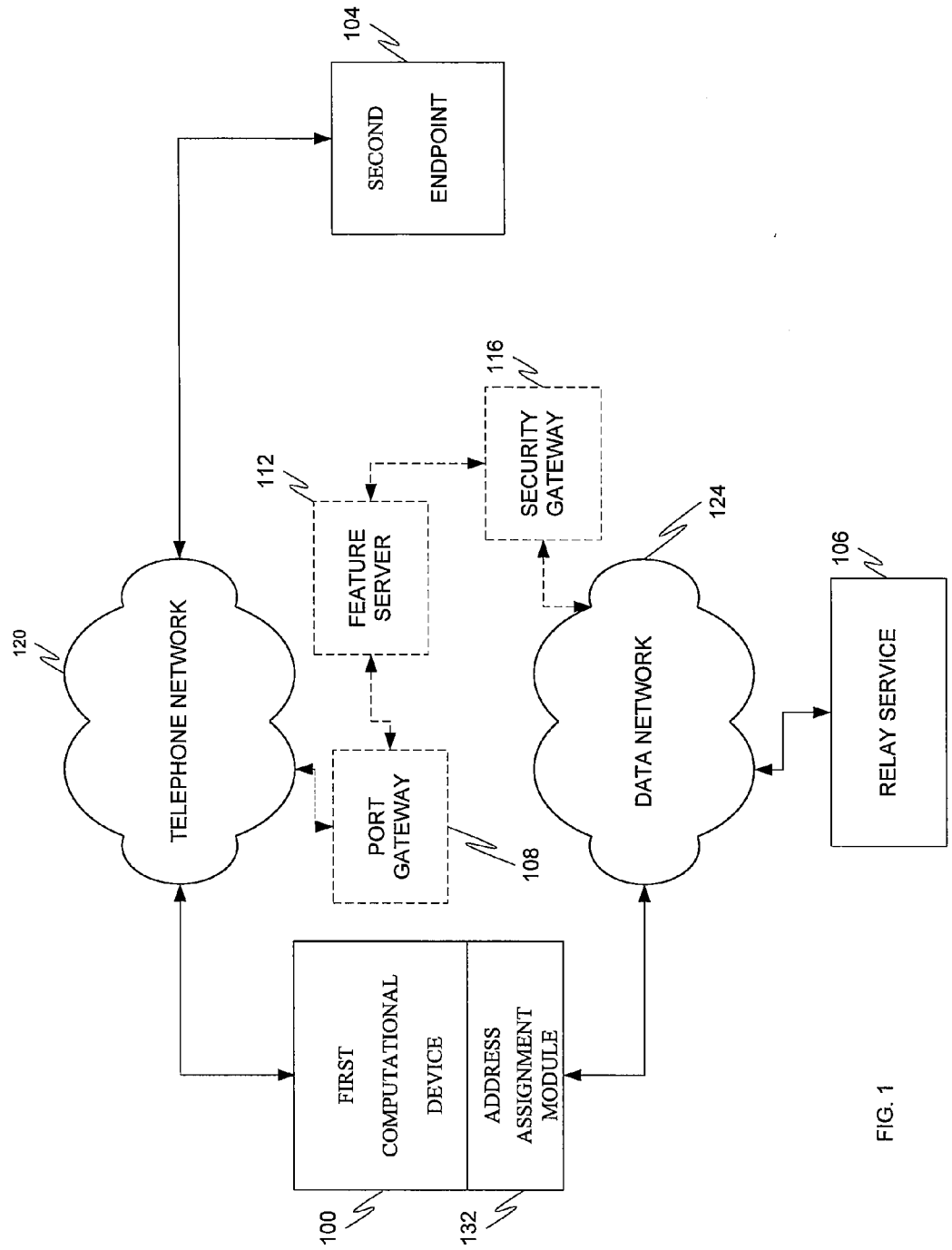
FIG. 1 is a block diagram of a network architecture according to an embodiment.

Referring to FIG. 1, a network architecture is depicted. The network architecture includes a first computational device 100, a second endpoint 104, relay service 106, port gateway 108, feature server 112, and security gateway 116, all interconnected by a telephone network 120 and data network 124.

The first computational device 100 can be any web browser- and keyboard equipped communication device. Examples include a personal computer, laptop, notebook computer, or Personal Digital Assistant ("PDA").

The second endpoint 104 can be a circuit- and/or packet-switched computational component, such as a personal computer, laptop, personal digital assistant, wired or wireless phone, and other communication device. As in the case of the first computational device 100, the second endpoint 104 can be equipped with a web browser and keyboard.

Preferably, the first computational device 100 and second endpoint 104 are able to engage in real time or live communication methods in addition to or in lieu of live voice communications.

The relay service 106 is Internet relay service, which is an alternative to teletext (TTY) devices for deaf and hearing- and/or speech-impaired people. The service is a type of contact center that connects users with a relay agent who dials and facilitates the call. A relay operator (not shown) will initiate and complete the user's call, dialing the party the user desires to contact, and remaining on the line to relay messages verbally to people who can hear or electronically via a TTY (Text Telephone) or computer. The service also allows hard-of-hearing-people to speak during their call using a feature known as two-line voice carry over. The relay service is available through many service carriers, such as Sprint Corp. and AT&T.

The port gateway 108 can be any suitably configured gateway for processing PSTN signals. The gateway, also called a protocol converter, is equipped for interfacing with another network that uses different protocols. The gateway can contain devices such as protocol translators, impedance matching devices, rate converters, fault isolators, and signal translators, as necessary, to provide system interoperability. Examples include the G150™, G250™, G350™, G450™, G600™, G650™, G700™, G860™ port networks, the Integrated Gateway™, and the G11™ and G10™ Public Switched Telephone Network ("PSTN") gateways of Avaya, Inc.

The security gateway 116 allow or control access to the feature server 112. In addition to the components of the port gateway 108, the security gateway 116 can further include security applications, such as a firewall configured to permit, deny, encrypt, decrypt, or proxy all computer traffic between different security domains based upon a set of rules and other criteria. The security gateway 116 may, or may not, be configured to pass control signalling or bearer traffic and further may, or may not, be user reconfigurable in response to commands received over the respective LAN.

The feature server 112 directs telephone calls to selected telephone numbers or addresses to the relay service 106. The feature server 112 has access to a database (not shown) including, for each user that is deaf, mute, or hearing- or speech-impaired, a telephone number and data network address pairing, an identifier of a relay service used by the user, a last known physical location of the user, information descriptive of the nature of the user's communication disability (e.g., deaf, hearing-impaired, mute, speech impaired, etc.) (thereby ensuring routing to an appropriate enabled and skilled agent or relay service), and information about the first computational device 100 (e.g., IP and/or Media Access Control ("MAC") address, IP address of security gateway servicing the first computational device 100, and Domain Name System ("DNS") information on the first computational device 100). In one configuration, the feature server 112 is part of the Network Switching Subsystem ("NSS"), Global System for Mobile ("GSM") communications, and the data structures are part of a home or visitor location register (discussed below). As will be appreciated, the NSS carries out switching functions and manages the communications between mobile phones and the PSTN. In another configuration, the feature server 112 is part of the switching fabric of the PSTN itself. In another configuration, the feature server 112 is maintained by a Public Safety Answering Point ("PSAP"), which is a call center responsible for answering calls to an emergency telephone number for police, firefighting, and ambulance services. Using the information provided by the feature server 112, the host PSAP is capable of identifying a caller's location not only for landline and wireless calls but also for Web browser-effected sessions with the PSAP. In the United States, the county or a large city usually handles this responsibility.

The telephone network 120 is preferably a digital telephone network, such as a cellular network and/or the PSTN, and the data network 124 is preferably a packet-switched wide area distributed processing network, such as the Internet.

Figure 2:
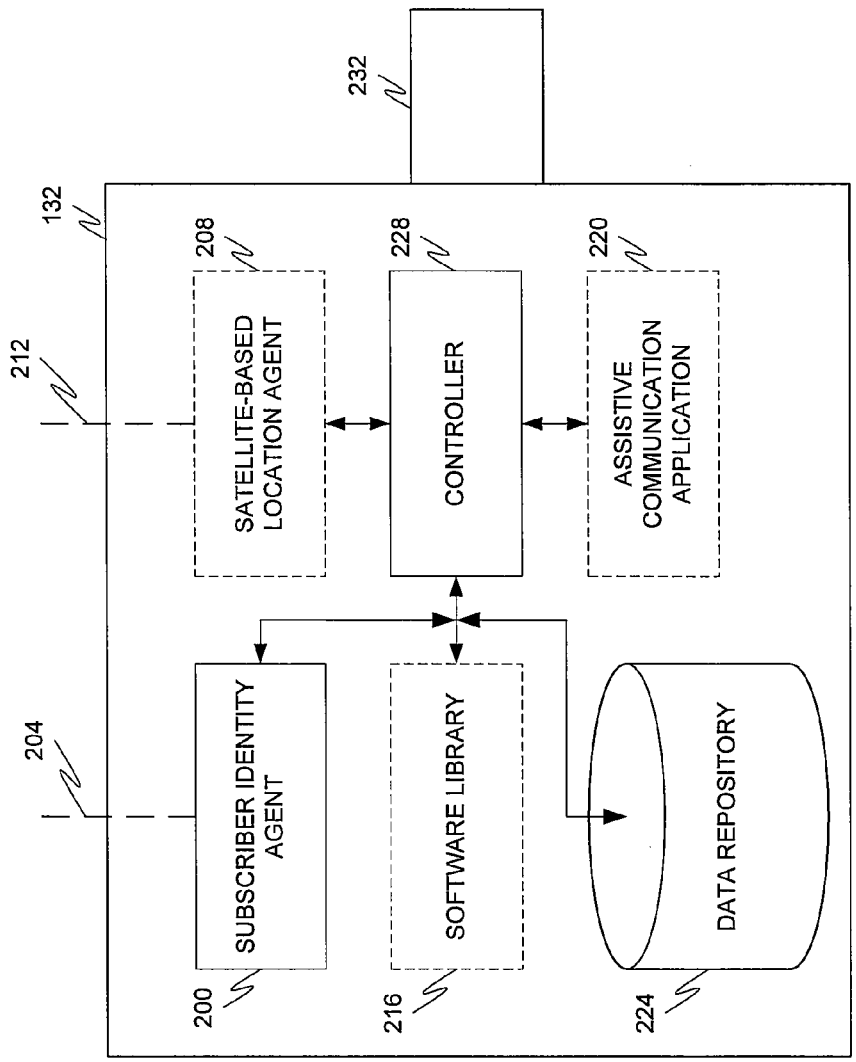
FIG. 2 is a block diagram of an address assignment module according to an embodiment.

Attached to the first computational device 100 is an address assignment module 132. The address assignment module 132 has a telephone number and is able to associate the telephone number with the network (e.g., browser) address of the first computational module 100. Referring to FIG. 2, the address assignment module 132, in one configuration, is embodied as a subscriber identity agent 200 having a corresponding (optional) antenna 204 to effect a wireless telephone call over the telephone network 120, an optional satellite-based location agent 208 having a corresponding antenna 212, a software library 216, an assistive communication application 220, a data repository 224, and a controller 228.

The address assignment module 132 is typically configured as a removable or permanently installed Subscriber Identity Module ("SIM") card and stores securely a unique service-subscriber key (or International Mobile Subscriber Identity ("IMSI")) used to identify the specific subscriber corresponding to the SIM and IMSI. As will be appreciated, each SIM is assigned to a specific user. The IMSI is formatted as follows: the first 3 digits represent the Mobile Country Code ("MCC"), the next 2 digits represent the Mobile Network Code ("MNC"), the next 10 digits represent the mobile station identification number. The mobile station identification number, for example, can be a unique and valid North American Numbering Plan ("NANP") telephone number configured by the carrier as being owned by a specific deaf, mute, hard-of-hearing, or speech-impaired user.

The satellite-based location agent 208 wirelessly determines the physical location of the address assignment module 132 relative to a global navigation satellite system. Examples of global navigation satellite systems include the Global Positioning System, Beidou or COMPASS, Galileo, GLONASS, Indian Regional Navigational Satellite System, and QZSS.

The software library 216 includes selected software, such as special-purpose device drivers that are required by some assistive technologies, special-purpose thick-client communication applications that support the user's needs, and plug-ins that allow browsers to be customized for special applications.

The assistive communication application 220 enables the user to effect, for example, TTY-type (e.g., IP text chat-type) text communications, over the data network 124, with a remote location, such as indirectly via the relay service 106 or directly with the remote location (e.g., with the second endpoint 104). The assistive communication application 220 is not limited to TTY-type communications but can also permit one or both parties to the communication session to exchange live video streams of one another (e.g., via video relay). This type of application would enable one or both parties to communicate by sign language. Alternatively, the application 220 can enable multimedia sessions, which combine two or more of text, voice, and video. The benefit of including on-board communication software is to allow any computer, and not just the computer owned or normally operated by the user, to provide the special-purpose telecommunication features and user interface that the user requires.

The data repository 224 includes selected information about the user identified by the address assignment module 132, the computational device to which the address assignment module 132 is connected or with which it is in communication, and the address assignment module 132 itself. The information includes, for example, an identifier identifying a relay service 106 used by the user, a current physical location of the user, information descriptive of the nature of the user's communication disability (e.g., deaf, hearing-impaired, mute, speech-impaired, etc.), other user medical and family information (e.g., medicinal allergies, family members, current health care provider information, medical conditions or complications, etc.), and information about the first computational device 100 (e.g., IP and/or Media Access Control ("MAC") address, IP address of security gateway 116 servicing the first computational device 100, and Domain Name System ("DNS") information on the first computational device 100). The physical location of the address assignment module 132 can be determined from the satellite-based location agent 208 or from a locating mechanism in an enterprise network. Such a mechanism can be, for example, a mapping of Ethernet port and/or MAC address to physical location.

Finally, the controller 228 controls all operations of the address assignment module 132, including receiving and processing communications from external sources and directing the processed communications to appropriate ones of the internal components, receiving and processing communications from internal sources and directing the processed communications to an external destination, and receiving, directing, and generating internally generated signals to an appropriate internal destination.

The address assignment module 132 includes a connector 232, such as a USB port connector, that connects the address assignment module 232 to a host computational component, such as the first computational device 100. The address assignment module 132 may have an on-board power source and/or receive power via the USB connection. The address assignment module 132 may communicate with the host computational device by other techniques, such as Bluetooth, Wifi, and WiMax.

The address assignment module 132 may communicate with the telephone network 120 in many ways. In one configuration, the address assignment module 132 connects to an RJ-11 analog jack (not shown) to support direct connectivity of the address assignment module 132 with the wired PSTN. In another configuration, the address assignment module 132 has a self-contained transmit/receive capability for connection to a variety of wireless telecommunication networks, including, without limitation, Bluetooth, Wifi, WiMax, GPS, cellular 2.5G, and cellular 3G.

Figure 3:
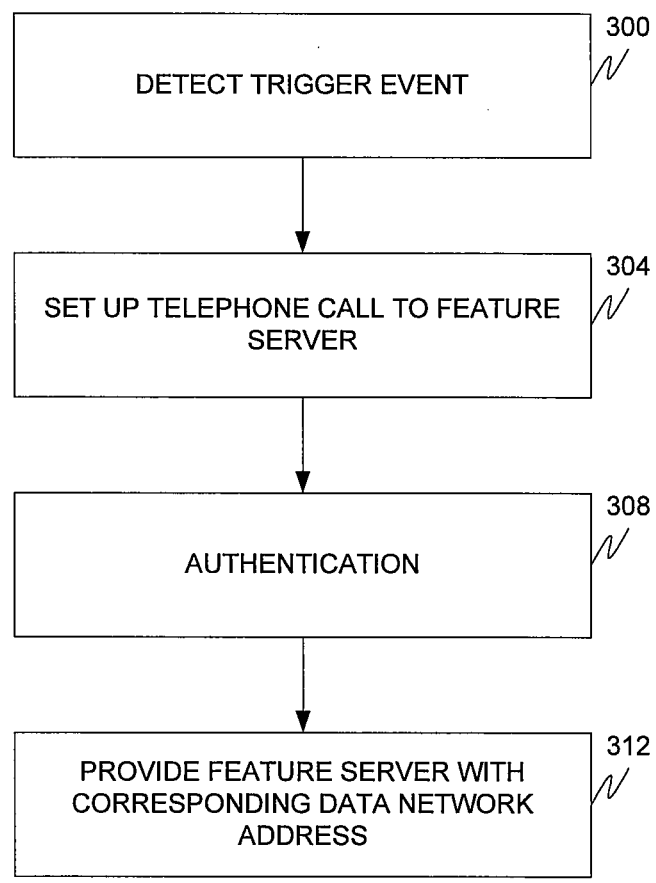
FIG. 3 is a flowchart according to an embodiment.

An operation of the address assignment module 132 will now be described with reference to FIG. 3. The flowchart assumes that the address assignment module 132 has been connected with or is in communication with a host computational device, such as the first computational device 100. An exemplary feature server 112, in this operational configuration, is the PSAP or a relay service.

In step 300, a trigger event is detected by the controller 228. The trigger event can be any selected event, including power up of the address assignment module 132 (such as what happens when a USB device is connected to a USB port of an active computer), power up of the host computer endpoint (or first computational device 100), the initiation of an Internet communication (e.g., chat or video relay) session (such as by accessing a URL of the PSAP or relay service), a change of the host computer's IP address, a change of the host computer's physical address, and request(s) from a network that the host computer self-identify.

In step 304 and in response to detection of the occurrence of a trigger event, the address assignment module 132 initiates and sets up a telephone call with the feature server 112. The call set up is performed using standard protocols, such as the Session Initiation Protocol ("SIP") and H.323.

In step 308 (which is optional), the user, first computational device 100, and/or address assignment module 132 authenticates itself with the feature server 112 and vice versa. Authentication may be performed using suitable techniques, including digital certificates, symmetrical or asymmetrical key exchange, and the like. Authentication information may be exchanged in any of the call set up or post-call set up signals.

In step 312, when authentication is successful, the address assignment module 132 provides the feature server 112 with a variety of information. One of the call set up signals or post-call set up signals includes, commonly as payload, a telephone number of the address assignment module 132, a data network address of the first computational device 100, an identifier of a relay service 106 used by the user, a current physical location of the user, an indicator of a type and/or severity of physical impairment of the user (e.g., deaf, hard-of-hearing, mute, speech impaired, etc.) (thereby ensuring routing to an appropriate enabled and skilled PSAP agent or relay service), other user medical and family information (e.g., medicinal allergies, family members, current health care provider information, medical conditions or complications, etc.) (hereinafter "healthcare information"), and/or information about the first computational device 100 (e.g., IP and/or Media Access Control ("MAC") address, IP address of the security gateway 116 servicing the first computational device 100, and Domain Name System ("DNS") information on the first computational device 100).

Following information exchange, the call is generally disconnected, though the connection may be persistent to allow updated physical location information to be periodically provided to the feature server 112.

In this manner, for example if the user initiates, via the first computational device 100, a web-based TTY transaction with the PSAP, the feature server 112 can use the information not only to assign the contact to an appropriate enabled and skilled PSAP agent but also to dispatch emergency personnel to the last reported physical location of the user. The information is determined by mapping the source network address of the first computational device 100 to determine the corresponding telephone number of the address assignment module 132. The telephone number is indexed against the last reported physical location of the address assignment module 132, which is assumed to be the same as the user's physical location. In one configuration, the information is determined directly by a PSAP feature server 112. In another configuration, the information is determined by a telephone network feature server 112 and provided, as part of a session set-up message to the PSAP.

Figure 4:
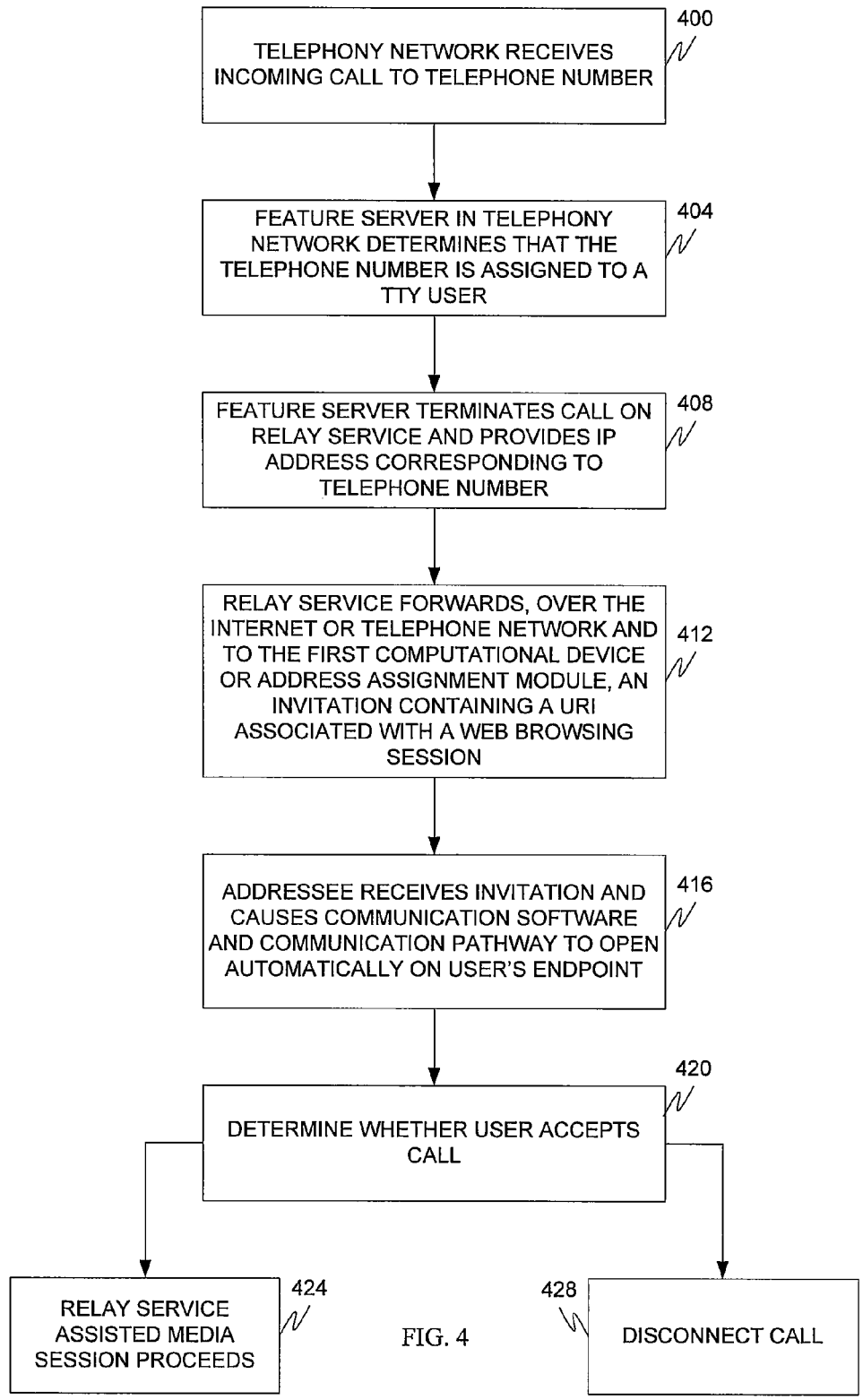
FIG. 4 is a flowchart according to an embodiment.

FIG. 4 shows another operational embodiment.

In step 400, the telephony network 120 receives an incoming call to the telephone number assigned to the address assignment module. The call is directed, by mapping to a home location register or visitor location register, to the appropriate feature server 112. As will be appreciated, the Home Location Register ("HLR") contains details of each mobile phone subscriber that is authorized to use the GSM core network. The HLR stores details of every SIM card issued by the mobile phone operator. The Visitor Location Register ("VLR") is a temporary database of the subscribers who have roamed into a particular area which it serves. The HLR and/or VLR store, for example, IMSI, authentication data, MSISDN (the subscriber's phone number), GSM services that the subscriber is allowed to access, access point (GPRS) subscribed or the GPRS settings to allow the subscriber to access packet services, current location of the subscriber (VLR and SGSN), call divert settings applicable for each associated MSISDN, and the HLR address of the subscriber.

In step 404, the feature server 112 in the telephony network 120 determines, using the data structures discussed above, that the telephone number is assigned to a user having a communication disability or impairment and that the user is currently associated with a web browser corresponding to the network address of the first computational device 100.

In step 408, the feature server 112 directs the call to the relay service 106, where the call is terminated and assigned to an appropriate agent.

In step 412, the relay service 106 forwards, over the data network 124 or telephone network 120, to the first computational device 100 or address assignment module 132, respectively, an invitation containing a Universal Resource Indicator ("URI") or Universal Resource Locator ("URL"), or web page address, associated with a web browsing session. A URL equivalent may be sent in lieu of the full URL. In one exemplary configuration, a tiny URL is provided to the address assignment module 132 over the telephone network 120. A tiny URL is a URL reduced to a smaller number (e.g., 10) characters in a string. In one exemplary configuration, a caller ID (which is controlled by the sending or intermediate node) is sent over the telephone network 120. The caller ID is commonly not a legitimate caller ID and resolves to a URL. For example, the caller ID could be 555-1212, which would resolve to www.5551212.com. Alternatively, the caller ID could be an index to a database, which would resolve to the URL.

In step 416, the first computational device 100 or address assignment module 132, as appropriate, receives the invitation and causes the assistive communication application (e.g., a text chat window or two-way video application) and a communication pathway (e.g., a call-specific URI or URL at the relay center 106) to open automatically on the first computational device 100 of the user.

In step 420, the first computational device 100 determines whether or not the user accepts the incoming call. If so, the relay service-assisted media session, in step 424, proceeds. If not, the call, in step 428, is disconnected.

Although the preceding steps are discussed with reference to the incoming call being directed to the contactee indirectly via a relay service associated with the contactee, it is to be understood that the concepts of the present invention work equally well with a point-to-point communication, particularly one between a hearing impaired caller and callee. The caller, who may or may not be hearing impaired, calls the SIM module of the hearing impaired callee. When the call is answered automatically by the callee's SIM module, the caller's communication device provides, to the callee's SIM module, a URL for the text session and/or the data address of the contactor's communication device. The SIM module provides the URL and/or data address to the contactee's communication device. In response, the text session is automatically initiated by the contactee's communication device. For instance, the Web browser on the contactee's communication device accesses, automatically, the URL and thereby initiates a text chat session with the contactor.

The exemplary systems and methods of this invention have been described in relation to telephone and data networks. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Mobile Switching Center ("MSC"), or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others. For example in one alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, via an address assignment module of a contactee and by a call over a telephone network, at least one of a Universal Resource Locator ("URL") and a data network address of a computational device of a contactor;
   (b) in response to the call over the telephone network, initiating, using the at least one of the URL and data network address and by a computational device of the contactee, at least one of a text- and video-based session with the contactor;
   wherein step (a) comprises the sub-steps:
   (A1) determining, by the telephone network, that the contactee has a communication disability or impairment;
   (A2) in response, directing the call to a relay service; and
   (A3) forwarding, by the relay service, the URL to the contactee's computational device.

2. The method of claim 1, wherein a telephone number is associated with the address assignment module of the contactee, wherein the address assignment module is a portable device comprising a Subscriber Identity Module ("SIM") card, wherein the computational device of the contactee is at least one of physically engaged and wirelessly in communication with the address assignment module, wherein the contactee is at least one of hearing-impaired, deaf, speech-impaired, and mute, and wherein the communication is at least one of text chat and live video.

3. The method of claim 1, wherein the at least one of the URL and data network address is the URL.

4. The method of claim 1, wherein the at least one of the URL and data network address is the data network address.

5. A tangible, non-transitory computer readable medium comprising processor executable instructions to perform the steps of claim 1.

6. A communication node, comprising:
   (a) a computational device having a network address on a data network; and
   (b) a portable address assignment module having a telephone number on a telephone network, the portable address assignment module being at least one of engaged physically and in communication wirelessly with the computational device and including:
   i. a subscriber identity agent comprising a unique service-subscriber key to identify a corresponding subscriber and
   ii. an assistive communication application to enable a user having a communication impairment to communicate, over the data network comprising the network address of the computational device being at least one of engaged physically and in communication wirelessly with the portable address assignment module, with another party.

7. The communication node of claim 6, wherein the portable address assignment module further includes a satellite-based location agent to determine a physical location of the portable address assignment module relative to a global navigation satellite system.

8. The communication node of claim 6, wherein the portable address assignment module further includes a data repository comprising at least one of an identifier of a relay service, a type of physical impairment of the user, a severity of physical impairment of the user, and healthcare information associated with the user.

9. The communication node of claim 6, wherein the communication impairment is one of hearing-impaired, speech-impaired, deaf, and mute and wherein the portable address assignment module is engaged with an externally accessible port of the computational device.

10. The communication node of claim 6, wherein the address assignment module comprises a controller and wherein the controller is operable, upon detection of a selected stimulus, to initiate a telephone call with a selected telephone number associated with a feature server and to provide to the feature server at least the network address and a current physical location of at least one of the address assignment module and computational device.

11. The communication node of claim 6, wherein the address assignment module receives, from a relay service and over the telephone network, a Universal Resource Locator ("URL") associated with a web page, wherein the address assignment module provides the URL to the computational device, and wherein a web browser of the computational device, using the URL, accesses the web page.

12. The communication node of claim 11, wherein the URL corresponds to a text chat session and wherein the relay service receives text from the user and reads the text to a party over a telephone call and wherein the relay service receives voiced words and phrases from the party and types the text equivalent in the text chat session with the user.

13. The communication node of claim 11, wherein the URL corresponds to a live video session.

* * * * *